No. 700,820. Patented May 27, 1902.
A. RALSTON.
TREE PROTECTOR.
(Application filed Feb. 10, 1902.)
(No Model.)
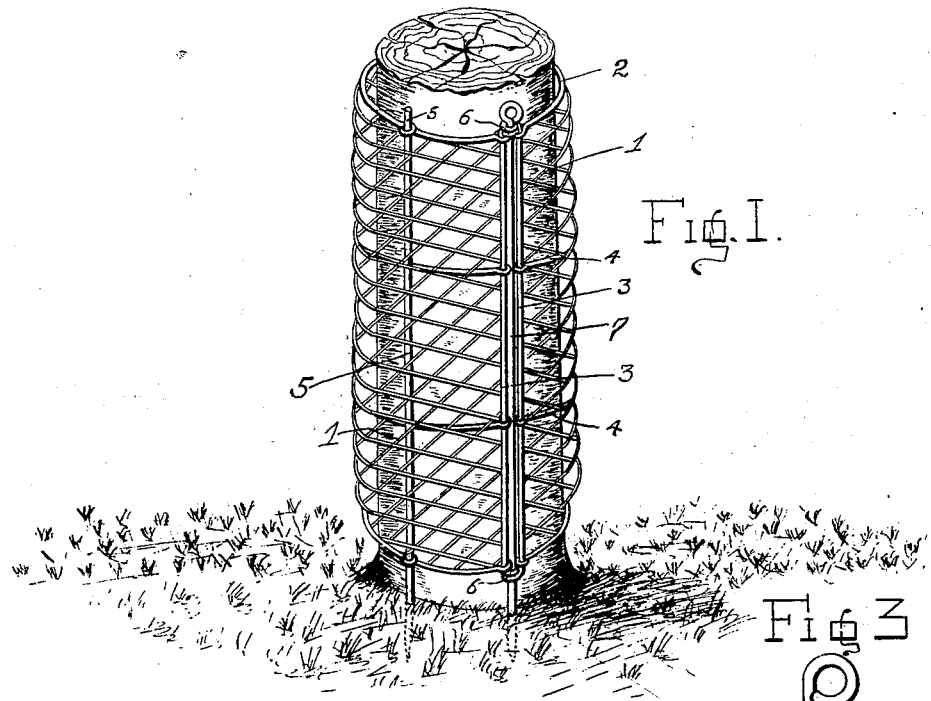
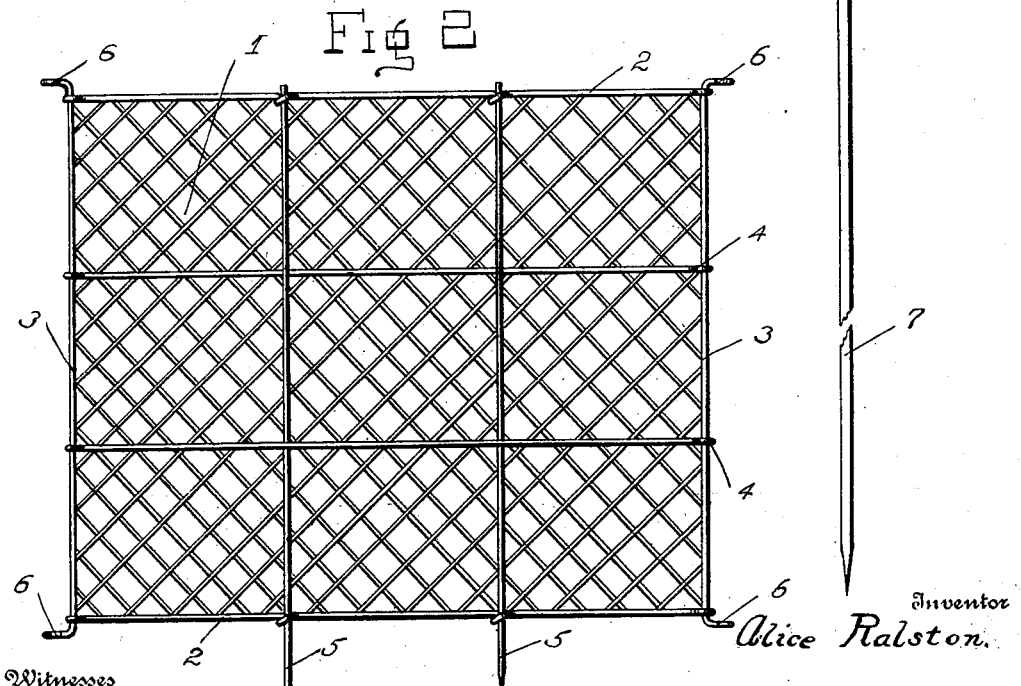
Witnesses
Inventor
Alice Ralston.
By Attorneys

UNITED STATES PATENT OFFICE.

ALICE RALSTON, OF NASHVILLE, TENNESSEE.

TREE-PROTECTOR.

SPECIFICATION forming part of Letters Patent No. 700,820, dated May 27, 1902.

Application filed February 10, 1902. Serial No. 93,362. (No model.)

*To all whom it may concern:*

Be it known that I, ALICE RALSTON, a citizen of the United States, residing at Nashville, in the county of Davidson and State of Tennessee, have invented certain new and useful Improvements in Tree-Protectors; and I do declare the following to be a full, clear, and exact description of the invention, such as will enable others skilled in the art to which it appertains to make and use the same.

The invention relates to tree-protectors.

The object of the invention is to provide a protector of this character which shall be simple of construction, durable in use, comparatively inexpensive of production, and easily and quickly applied to and removed from a tree and which may be compactly packed for storage or transportation.

With this and other objects in view the invention consists of certain novel features of construction, combination, and arrangement of parts, which will be hereinafter more fully described, and particularly pointed out in the appended claim.

In the accompanying drawings, Figure 1 is a view illustrating my invention applied to a tree. Fig. 2 is a plan view showing the protector in its flat position or in the position in which it is stored or packed for transportation, and Fig. 3 is a view of the removable stake.

Referring to the drawings, 1 denotes the body or shield of the protector, which consists of flexible material, preferably, but not necessarily, wire-netting, the meshes of which are of such gage as to exclude small animals and the marginal edges of which are bound by relatively stiff wires or rods, those at the horizontal edges being denoted by the numeral 2, and those at the side edges by the numeral 3. Brace rods or wires 4 are preferably employed and extend across the body of the protector and connect the rods or wires 3. Stakes 5 are secured to the rods or wires 2 2 and 4 4 and have their lower ends projecting below the lowermost wire 2 and are adapted to be driven into the ground. The wires 3 3 are provided with vertically-disposed loops or eyes 6, which when the body portion is bent around the tree-trunk are adapted to aline, and when so alined the removable stake 7 is inserted through said loops or eyes and with the stakes 5 5 is driven into the ground, thus securely anchoring the protector to the tree. The rods or wires 2 2 and 4 4 serve to stiffen the body of the protector against collapsing and will effectually hold it in cylindrical form when in position about the tree, while the stakes 5 5 and the wires or rods 3 3 will serve to brace and support the body portion in vertical position against endwise contraction, the stakes 5 5 and 7 serving additionally to anchor the protector in position.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

A tree-protector comprising a flexible body portion, rods connected to the upper and lower edges of the body portion, and rods connected to the body portion intermediate its upper and lower edges, each of said rods projecting beyond the ends of the body portion and formed with eyes, end rods engaged with the eyes of said rods and each having angularly-projected registering eyes, vertical stakes secured to the upper and lower rods and having their lower ends projecting below the lower edge of the body portion, and a removable driving-stake adapted to be inserted through the angularly-disposed eyes and with the first-named driving-stakes to be driven in the ground and thus anchor the body portion in position around the tree-trunk, substantially as and for the purpose specified.

In testimony whereof I have hereunto set my hand in presence of two subscribing witnesses.

ALICE RALSTON.

Witnesses:
 A. B. ANDERSON,
 J. D. BROWN.